United States Patent

Uematsu et al.

[11] Patent Number: 5,791,193
[45] Date of Patent: Aug. 11, 1998

[54] ROTOR SUPPORT STRUCTURE OF TRANSMISSION

[75] Inventors: Yuichi Uematsu; Takayoshi Ichikawa, both of Fuji; Kazumi Kamo, Atsuta-ku, all of Japan

[73] Assignee: Jatco Corporation, Japan

[21] Appl. No.: 705,890

[22] Filed: Aug. 28, 1996

[30] Foreign Application Priority Data

Aug. 28, 1995 [JP] Japan .................. 7-242552

[51] Int. Cl.$^6$ .................. F16H 57/04; F16D 13/74
[52] U.S. Cl. .................. 74/467; 185/6.12; 192/70.12; 475/159
[58] Field of Search .................. 74/467; 184/6.12; 192/70.12; 475/159

[56] References Cited

U.S. PATENT DOCUMENTS

| | | | |
|---|---|---|---|
| 4,347,765 | 9/1982 | Leonard et al. | 74/869 |
| 5,285,870 | 2/1994 | Yuge | 184/6.12 |
| 5,456,129 | 10/1995 | Tane et al. | 184/6.12 X |

Primary Examiner—Allan D. Herrmann
Attorney, Agent, or Firm—Rossi & Associates

[57] ABSTRACT

A sleeve is covered on an outer peripheral surface of a shaft shaped part formed integrally with a support wall fixed to a casing of a transmission, to which sleeve a pair of seal rings are fitted putting a circumferential oil groove therebetween. A groove continuously formed in the outer peripheral surface and the tip end surface of the shaft shaped part is covered with the sleeve to form an oil passage structure. Part of oil supplied from an oil passage penetrating a main shaft to a discharge space for lubricating a bearing located at the tip end of the shaft shaped part flows into the oil passage structure and is further transferred to a space between the support wall and a clutch drum to lubricate the seal ring located on the side of the support wall from the outside.

5 Claims, 8 Drawing Sheets

ROTOR SUPPORT STRUCTURE OF TRANSMISSION

BACKGROUND OF THE INVENTION

1. Field of the Invention

The present invention relates to a rotor support structure of a transmission in which one rotary element among those of the transmission is rotatably supported with a columnar rotor supporter fixed to a casing of the transmission, and more specifically to a lubricating structure of the rotor support structure.

2. Description of the Prior Art

A gear change mechanism of an automatic transmission includes in a casing many rotary elements such for example as a clutch, a brake, planetary gears, and a shell structure that couples rotary members, and the like. Part of the rotary element is supported on a rotary shaft disposed on the central axis of the speed change mechanism while the other part of the same is supported on the casing of the automatic transmission.

An example is disclosed in Japanese Patent Application Laid-Open No. 61-45137 of the rotor support structure where one rotary element of the transmission is rotatably supported with the columnar rotor supporter fixed to the casing of the automatic transmission. The rotor supporter is herein presented as being provided on a support wall fixed to the casing and standing up radially and as being protruded axially into a column shape.

A circumferential oil groove is formed in an outer peripheral surface of the rotor supporter together with a pair of sealing rings disposed on the opposite sides of the circumferential oil groove, and a cylindrical part to be supported formed on the central side of the one rotary element is rotatably supported around the rotor supporter with the pair of the sealing rings.

The rotor supporter is formed by fitting a cylindrical sleeve member in which there are formed a pair of grooves to which grooves the sealing rings are fitted on an outer periphery of a shaft shaped part formed integrally with the support wall. For the support wall and the shaft shaped part there is used an inexpensive material easy to be machined while for the sleeve member there is used a material compatible with the sealing rings (material not worn even in direct contact with the sealing rings).

An oil passage structure is formed between the rotor and the support wall for guiding lubricating oil. The oil passage structure is formed by directly communicating a small lateral hole with a large lubricating oil supply passage radially penetrating the support wall at a height substantially the same level as that of the outer peripheral surface of the rotor supporter. The large lubricating oil supply passage is a main lubricating oil supply passage for collectively supplying the lubricating oil from a hydraulic pressure control valve to a gear change mechanism side.

In the rotor support structure disclosed in Japanese Patent Application Laid-Open No. 61-45137, there is a main lubricating oil supply passage in an adjacent support wall so that it is possible to take out the oil for lubricating from the outside the sealing ring located in the vicinity of the support wall by communicating a lateral hole with the main lubricating oil supply passage. However, provided there is no proper oil passage in the adjacent support wall, such an oil passage structure can not be achieved.

Even if there is existent the main lubricating oil supply passage in the adjacent support wall, the oil passage structure of the type where an elongated lateral hole is directly communicated with the main lubricating oil supply passage has the following troubles:

(1) The main lubricating oil supply passage is located most upstream a complicated lubricating circuit for supplying lubricating oil to all the corners of each part of the speed change mechanism. Accordingly, once the lubricating oil is released into the casing through the lateral hole in the main lubricating oil supply passage, even with the considerably small lateral hole pressure in the main lubricating oil supply passage is lowered. The lowering of the pressure might cause lack of the flow rate of the lubricating oil and clogging of the oil passage at part of the final end of the lubricating circuit. Provided the oil is not satisfactorily supplied, durability of wearing plates of the bearing and the clutch is deteriorated.

(2) The purpose of the oil passage structure with the small lateral hole is to lubricate the seal ring on the side close to the support wall from the outside. The amount of the oil required for this purpose is very little and hence the size of the lateral hole may be small. The size of the hole is however limited in view of drilling, and hence it is difficult to form a lateral hole of the order not causing pressure lowering in the main lubricating oil supply passage.

SUMMARY OF THE INVENTION

It is an object of the present invention to provide a rotor support structure of a transmission in which a proper amount of oil is stably supplied to an oil seal even without provision of a proper oil passage in the support wall and pressure in the main lubricating oil supply passage is prevented from being lowered.

To achieve the above object, a rotor support structure of a transmission according to the present invention includes a support wall fixed to a casing of the transmission on its outer peripheral side and vertically radially standing up, a rotor supporter provided on the support wall and protruded axially in a columnar configuration, a pair of seal rings disposed on opposite sides of a circumferential oil groove provided in the outer periphery of the rotor supporter, and a bearing disposed on a protruded tip end side of the rotor supporter and lubricated with oil released from a lubricating oil supply passage in the transmission, and is adapted such that a cylindrical part formed on the side of the center of one rotary element of the transmission is rotatably supported around the rotor supporter in the state where the circumferential oil groove is sealed with the seal rings, the improvement being such that an oil passage structure which reaches a position located in the vicinity of the support wall on the outer peripheral surface from the side of the bearing of the rotor supporter is provided whereby at least part of oil discharged from the lubricating oil supply passage for lubricating the bearing is guided to a space located in the vicinity of the support wall.

Part of a flow of existing oil is used as the oil transferred to the oil passage structure for lubricating the bearing, and the oil passage structure branches off after the oil is discharged into a space in the casing through the lubricating oil supply passage so that the main lubricating oil supply passage does not require an exclusive lubricating oil to the oil passage structure. The flow rate of the oil can be set substantially independently of pressure in the main lubricating oil supply passage.

Since the oil flowing through the oil passage structure does not affect the pressure in the main lubricating oil supply passage, the seal ring can be lubricated from the outside without causing the insufficient flow rate of the oil at another final end of the complicated lubricating circuit and further a large cross section can be adopted for the oil passage structure avoiding clogging.

Even when there is no oil passage for proper lubricating oil in the adjacent support wall, a proper amount of oil can be circulated to a space close to the support wall and hence the seal ring located in the close vicinity of the support wall can be satisfactorily lubricated, and since oil, impurities, and dust which frequently stay along the seal ring are washed away owing to the circulation of the oil, durability and life time of the seal ring are improved.

The rotor supporter is formed by fitting the cylindrical sleeve member to the outer periphery of a shaft shaped part formed integrally with the support wall, in which sleeve member there are formed the circumferential oil groove and a pair of grooves located on opposite sides of the circumferential oil groove over which the seal rings are fitted, and for the oil passage structure there can be used a groove formed in at least one of the shaft shaped part and the opposite surface of the sleeve member.

Hereby, part of the oil discharged into the space in the casing through the lubricating oil supply passage for lubricating the bearing is transferred to the space close to the support wall through the lubricating oil supply passage and is thereafter adapted to the seal ring located in the vicinity of the support wall from the outside.

Since the oil passage structure can be formed by making use of the mating surfaces of the sleeve and the shaft shaped part, a necessary oil passage structure can be formed even when there is any step on the shaft shaped part and the shaft shaped part is not so large to form a hole. In comparison with the case where there is adopted a drilled hole that penetrates the shaft shaped part axially, the shape of the cross section of the oil passage structure and the cross sectional area of the same can be considerably freely set. For example, there is ensured even the cross sectional area (flow passage area) of an oil passage structure having the size impossible to achieve with a round hole by extending the groove width.

The sleeve member preferably includes an insertion cylinder for holding the outer peripheral surface of the shaft shaped part thereinside, and an annular cover extending from one end of the insertion cylinder to the inside and held between a tip end surface of the shaft shaped part and the bearing, and in that case the oil passage structure includes a groove formed in at least one of the tip end surface of the shaft shaped part and the cover.

The cover of the sleeve member reinforces the entire rigidity of the sleeve member to ensure support rigidity of the bearing whereby the oil discharged toward the side of the inner periphery of the bearing can be guided to the part close to the support wall keeping the durability of the bearing.

For the oil passage structure there is also useable a through-hole provided in the shaft shaped part instead of the grooves formed in the mating surfaces of the shaft shaped part and the sleeve member.

According to this construction, the oil can be guided into the space close to the support wall even in the structure where no sleeve is assembled with the shaft shaped part and hence there can be adopted as the oil passage structure a folded shape and a slope not restricted by the external shapes and the steps of the shaft shaped part and the sleeve member.

BRIEF DESCRIPTION OF THE DRAWINGS

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

In what follows, there will be described a rotor support structure for supporting a clutch drum, as one rotary element of the transmission, according to a first embodiment of the present invention with reference to FIG. 1 to FIG. 3B.

Figure 1:
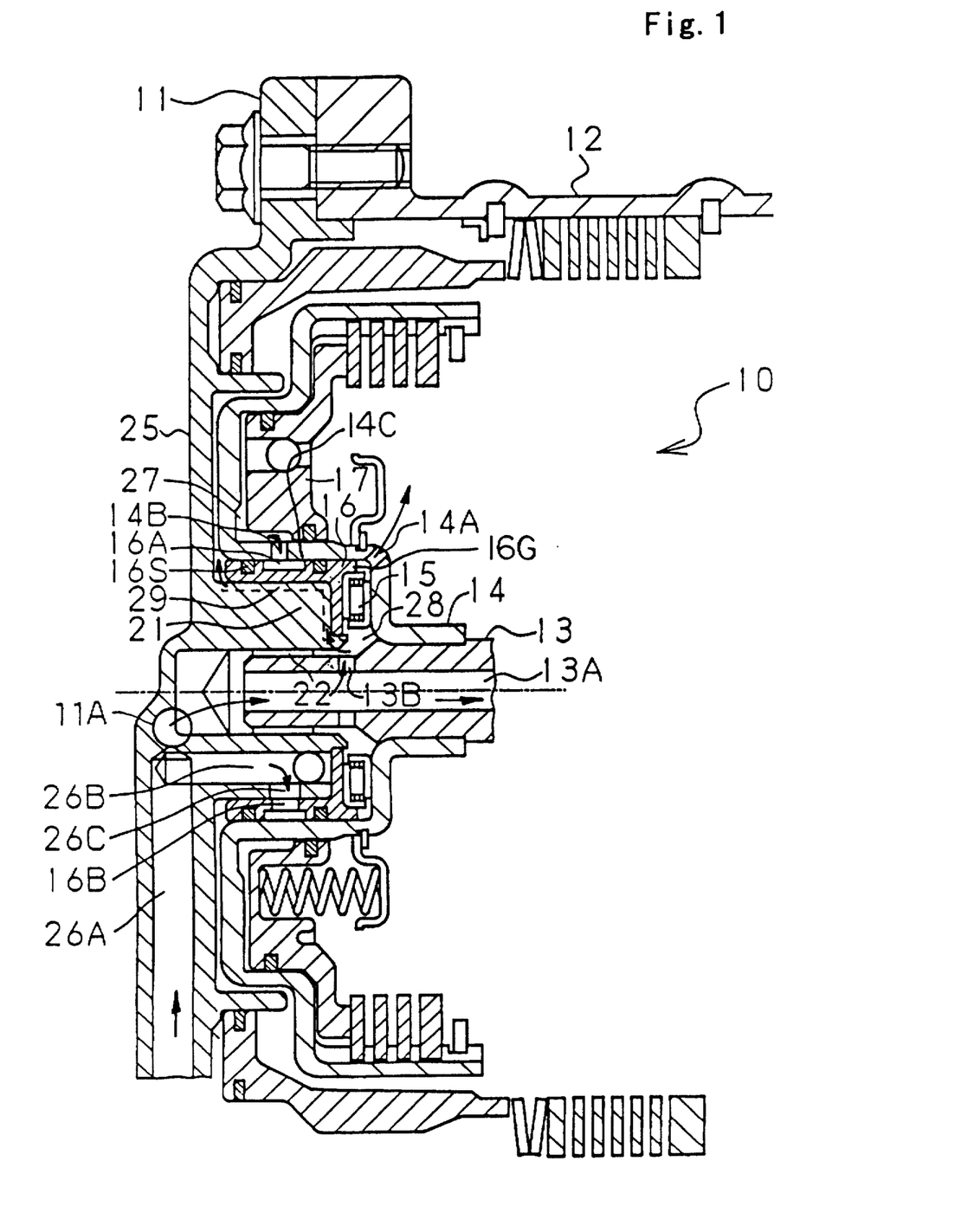
FIG. 1 is a sectional view of a casing structure of an automatic transmission according to a first embodiment of the present invention.

In FIG. 1, a gear change mechanism 10 of an automatic transmission is disposed in a casing where a side cover 11 is coupled with one end of a transmission casing 12. The gear change mechanism 10 includes many rotary elements such as two sets of planetary gears (not shown). Some of the rotary elements (not shown) of the gear change mechanism 10 are supported rotatably on a main shaft 13 of the automatic transmission. An end of the main shaft 13 on the side of the side cover 11 is rotatably supported by a bearing bush 22 fitted to the side cover 11. Axial load exerted on the main shaft 13 is supported by a thrust bearing 15.

As one rotary element of the transmission, clutch drum 14 disposed close to the side cover 11 is fixed to the main shaft 13 and is rotated integrally with the main shaft 13. The clutch drum 14 is formed into an annular external appearance with an inverted U-shaped cross section, and includes an annular hydraulic piston 17 thereinside. A cylinder space 27 is formed between the bottom of the clutch drum 14 and the hydraulic piston 17. The hydraulic piston can be moved in the right direction in the figure by supplying hydraulic pressure to the cylinder space 27. The side cover 11 comprises a support wall 25 standing up radially and a shaft shaped part 21, having a columnar shape, that is formed integral with and protrudes axially from the support wall 25.

The foregoing bearing bush 22 is inserted into the shaft shaped part 21. A rotor supporter is formed by fitting a sleeve 16 to the shaft shaped part 21. In other words, the outer peripheral side of the shaft shaped part 21 is inserted into the sleeve 16. The clutch drum 14 is rotatably supported on the sleeve 16 by its cylindrical part 14C which is formed on a side of its center. The sleeve 16 is formed with a material (cast iron, for example) compatible with a seal ring 16S (fluoroplastic) compared with the shaft shaped part 21 (aluminum alloy) like an example disclosed in Japanese Patent Application Laid-Open No. 61-45137.

The sleeve 16 positions and supports the thrust bearing 15 on the central axis with the aid of a flange 16G and constitutes part of an oil passage that supplies hydraulic pressure to the cylinder space 27.

More specifically, the hydraulic pressure is supplied from a vertical oil passage 26A formed in the side cover 11 to an oil passage hole 16B in the sleeve 16 through oil passages 26B, 26C. The oil in the oil passage hole 16B fills a circumferential oil groove 16A going round the outer periphery of the sleeve 16 therewith, and flows into the cylinder space 27 through an oil passage hole 14B the cylindrical part of in the clutch drum 14. A pair of the seal rings 16S are disposed putting the circumferential oil groove 16A therebetween in order to confine the oil in a space surrounded by the circumferential oil groove 16A and the clutch drum 14.

In contrast, oil for lubricating each part of the gear change mechanism 10 and removing heat from the same is supplied from the left side in the right direction through an oil passage 13A formed in the center of the main shaft 13 from an oil passage 11A provided in the side cover 11. The oil in the oil passage 13A is discharged into an outside discharge space 28 through a hole 13B in the main shaft 13 and is thereafter guided outwardly by being energyzed with centrifugal force and gravity due to rotations of the main shaft 13, the clutch drum 14, the thrust bearing 15.

The oil after passing through the thrust bearing 15 is further guided outwardly of the gear change mechanism 10 through a hole 14A in the clutch drum 14. The lubricating oil is directed to reach an inner wall of the transmission casing 12 and fall down therealong, and is finally recovered in an oil pan (not shown) coupled with a bottom side of the transmission casing 12.

In the automatic transmission constructed as described above, the clutch drum 14 is rotated together with the main shaft 13 substantially at all times, and the seal ring 16S is always exposed to a sliding and wearing state between it and the clutch drum 14 or a ring groove in the sleeve 16. In the present embodiment, there is additionally provided a new oil passage structure 29 (shown by a broken line) in order to reinforce lubrication for such a seal ring 16S.

Figure 3A:
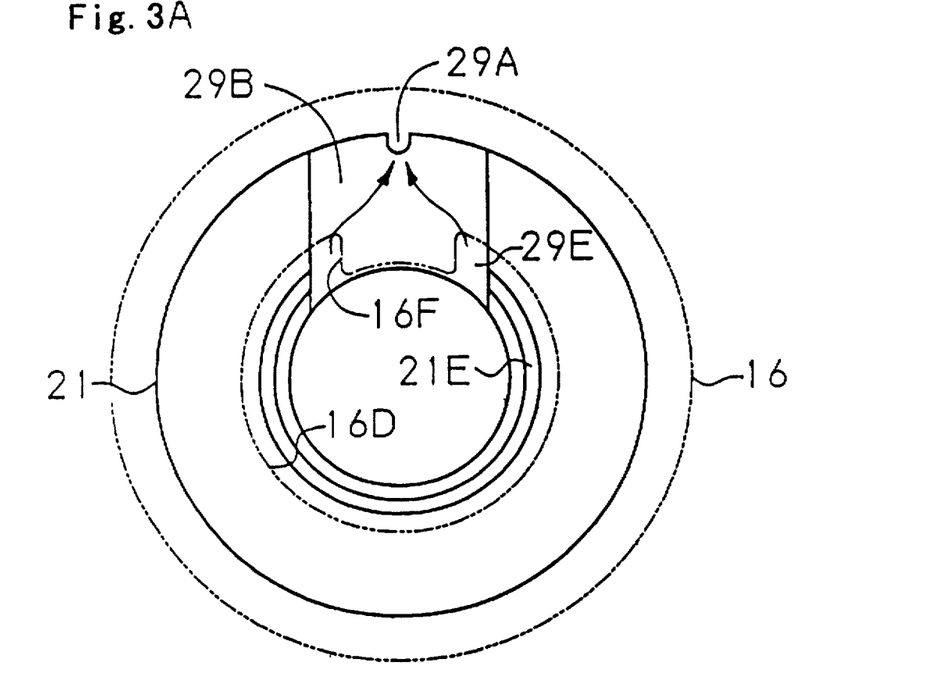
FIG. 3A is a front view of the tip end of a shaft shaped part of an oil passage structure.
Figure 3B:
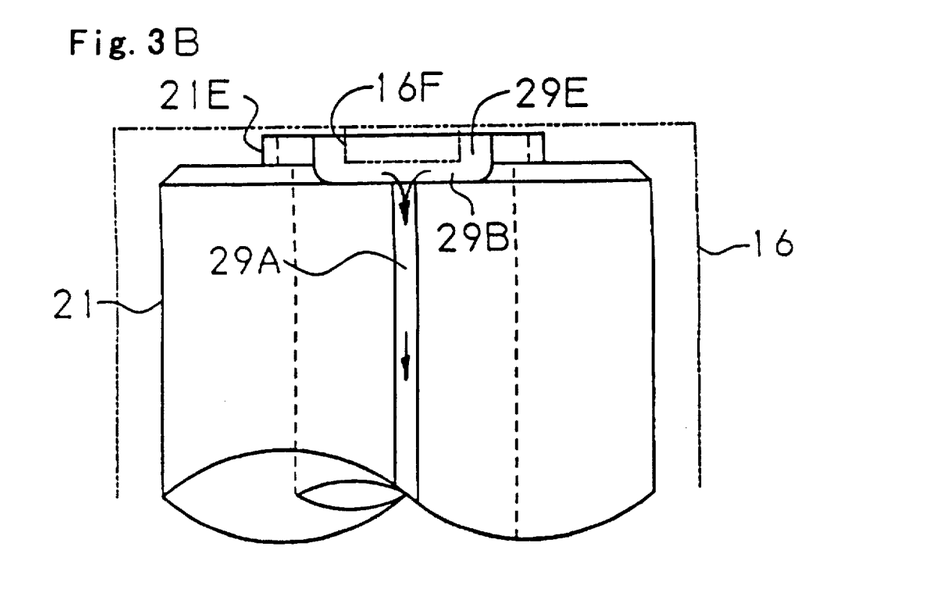
FIG. 3B is an upper view of the tip end of the shaft shaped part of the oil passage structure.

The oil passage structure 29 branches the part of the oil discharged into the discharge space 28 owing to the centrifugal force of the main shaft 13 and guides it to a space between the side cover 11 and the sleeve 16 to lubricate the seal ring 16S located on the side of the side cover 11 externally. The oil passage structure 29 is formed between contact surfaces of the shaft shaped part 21 and the sleeve 16 as illustrated in FIGS. 3A to 3B. An axial oil groove 29A formed in the outer peripheral surface of the shaft shaped part 21 leaves its part on the side of the support wall 25 behind and is covered with the insertion cylinder 16E of the sleeve 16.

A wider radial oil groove 29B is formed in the tip end surface of the shaft shaped part 21 intersecting the axial oil groove 29A. The radial oil groove 29B is covered with a backup plate (annular cover) 16D of the sleeve 16. A stopper part 16F formed in part of the backup plate 16D of the sleeve 16 is held in a cutout groove in a tip end protrusion 21E of the shaft shaped part 21, and forms oil intake gaps on opposite sides thereof.

Figure 2A:
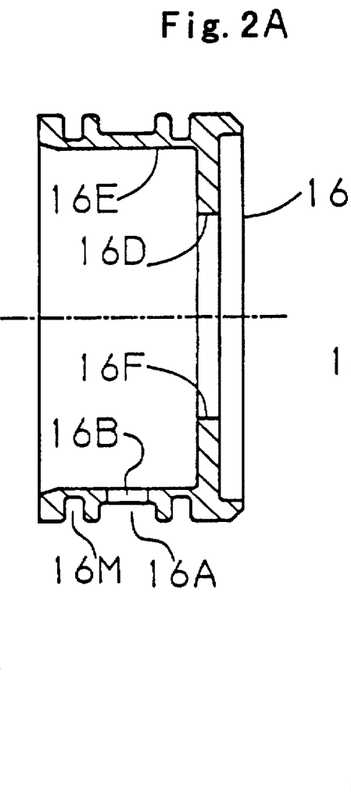
FIG. 2A is a sectional view of a sleeve.
Figure 2B:
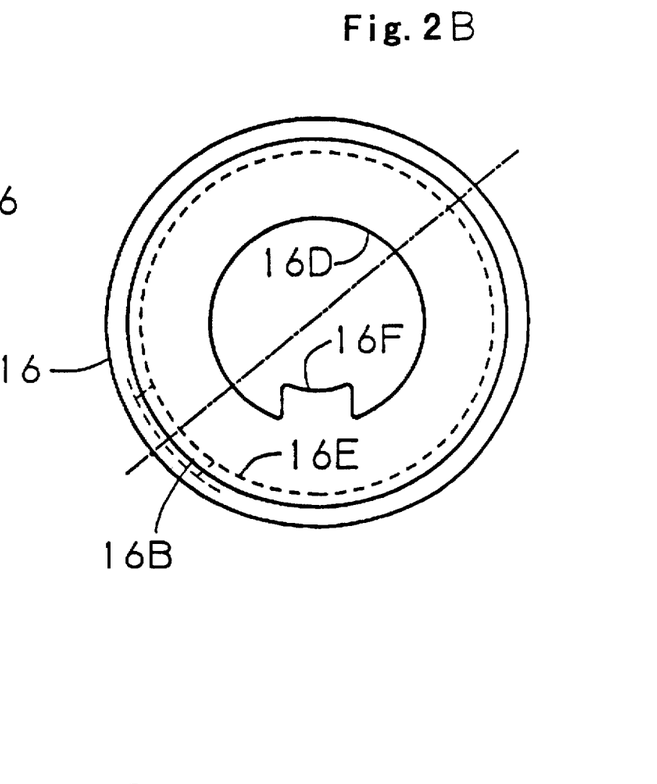
FIG. 2B is a front view of the sleeve.
Figure 2C:
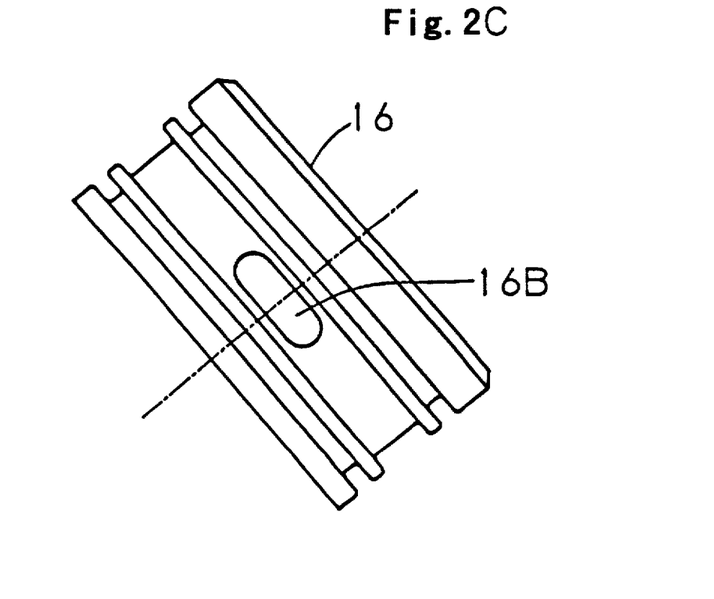
FIG. 2C is a side view of a hole in an oil passage of the sleeve.

A pair of ring grooves 16M are formed in the outer periphery of the sleeve 16 putting the circumferential oil groove 16A therebetween as illustrated in FIG. 2A. An oil passage hole 16B is formed through the bottom of the circumferential oil groove 16A as illustrated in FIG. 2C.

In accordance with the clutch drum support structure of the first embodiment, the lubricating oil is actively fed through the oil passage structure 29 between the facing surfaces of the side cover 11 and the clutch drum 14 into which the lubricating oil is difficult to flow from the outside so that the seal ring 16S on the side of the side cover 11 is satisfactorily lubricated also from the outside to improve the durability of the seal ring 16S that is in the sliding/rubbing state with respect to the sleeve 16.

Any oil and impurity entering between the mating surfaces of the side cover 11 and the clutch drum 14 are prevented from staying there, and are always washed away with the new oil so that any impurity is prevented from being rolled in the seal ring 16S and damaging the same.

The oil released to pressure in the casing is recovered in the discharge space 28 and an oil flow is formed in the oil passage structure 29 by making use of centrifugal force. etc., independent from the pressure in the oil passage 13A so that the presence of the oil passage structure 29 does not affect the pressure in the oil passage 13A in the main shaft 13 without the possibility of the amount of supply of oil to other lubricating passages to which the lubricating oil is supplied from the oil passage 13A being reduced or exhausted.

Although the radial oil groove 29B is formed in the tip end of the shaft shaped part 21, durability of the bearing (thrust bearing 15) is prevented from being deteriorated by interposing the backup plate 16D of the sleeve 16.

In the following, there will be described a second embodiment with reference to FIGS. 4, 5. The whole structure of an automatic transmission illustrated in FIG. 4 is based upon an automatic transmission disclosed in Japanese Patent Application Laid-Open No. 61-45173.

Figure 4:
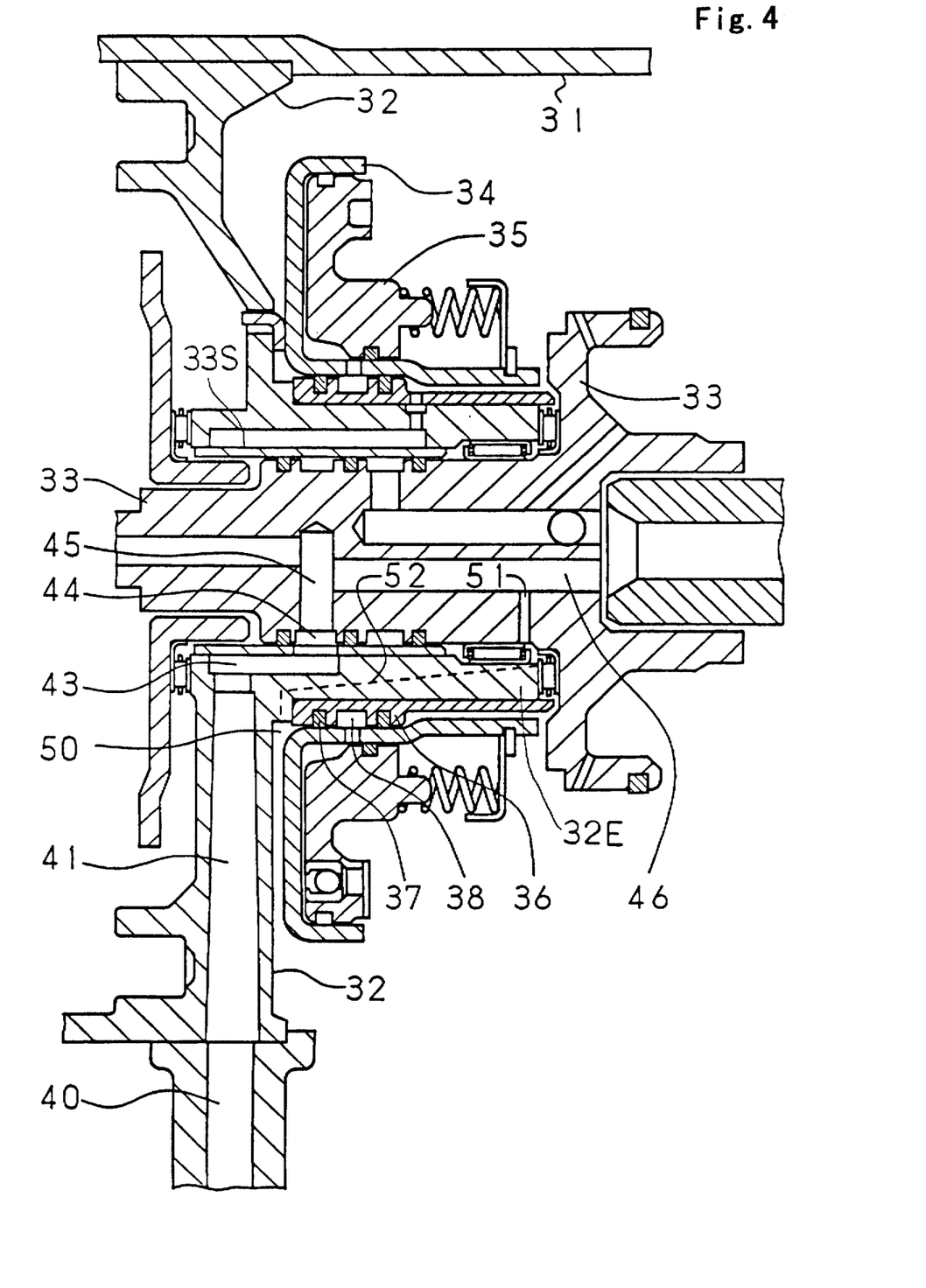
FIG. 4 is a sectional view of a lubricating structure of the automatic transmission according to a second embodiment.

In FIG. 4, an partition member 32 is fixed to the inside of a transmission casing 31. The partition member 32 separates a space in the transmission casing 31 horizontally and rotatably supports a central main shaft 33, and positions and supports a hydraulic piston mechanism, etc., (not shown) in the transmission casing 31.

The partition member 32 includes a plurality of hydraulic passages for supplying hydraulic pressure and lubricating oil from a control valve unit (not shown) disposed under the transmission casing 31 to the central side. For example, a vertical oil passage 41 guides lubricating oil supplied from the lower portion through an oil passage 40 to the center side and supplies it to necessary mechanical parts surrounding the main shaft 33.

The partition member 32 includes a cylindrical shaft shaped part 32E thereof protruded from the center of its part standing up in the shape of a flange in the right direction in the figure. The foregoing main shaft 33 is rotatably supported inside the shaft shaped part 32E.

An annular clutch drum 34 disposed close to the partition member 32 accommodates a hydraulic piston 35 axially movably, and is rotatably supported on the outer periphery of a shaft shaped part 32E through a sleeve 36. The sleeve 36 includes a pair of seal rings 37 disposed putting a central circumferential oil groove 38 therebetween.

The circumferential oil groove 38 constitutes part of a passage for supplying hydraulic pressure to a cylinder space located between the clutch drum 34 and the hydraulic piston 35. The seal ring 37 encloses hydraulic pressure in the circumferential oil groove 38 when the hydraulic piston is driven and simultaneously rotatably holds a cylinder surface inside the clutch drum 34.

Lubricating oil supplied through the vertical oil passage 41 is branched in respective directions after flowing into the cylindrical oil passage 43. The cylindrical oil passage 43 is constructed by covering a cylindrical concave part formed in an inner periphery of the shaft shaped part 32E with a sleeve 33S. An inner peripheral surface of the sleeve 33S constitutes a sliding surface with a main shaft 33.

One of branches of the lubricating oil reaches an axial oil passage 46 after passage through an oil passage 45 from the circumferential oil groove 44 in the main shaft 33. The axial oil passage 46 reaches an outer periphery of the main shaft 33 after passage through a small, i.e., high flow passage resistance oil passage hole 51. An oil passage structure 52 collects oil released to pressure in the casing through the oil passage hole 51 and bypasses it to a space 50 between the partition member 32 and the clutch drum 34.

Figure 5:
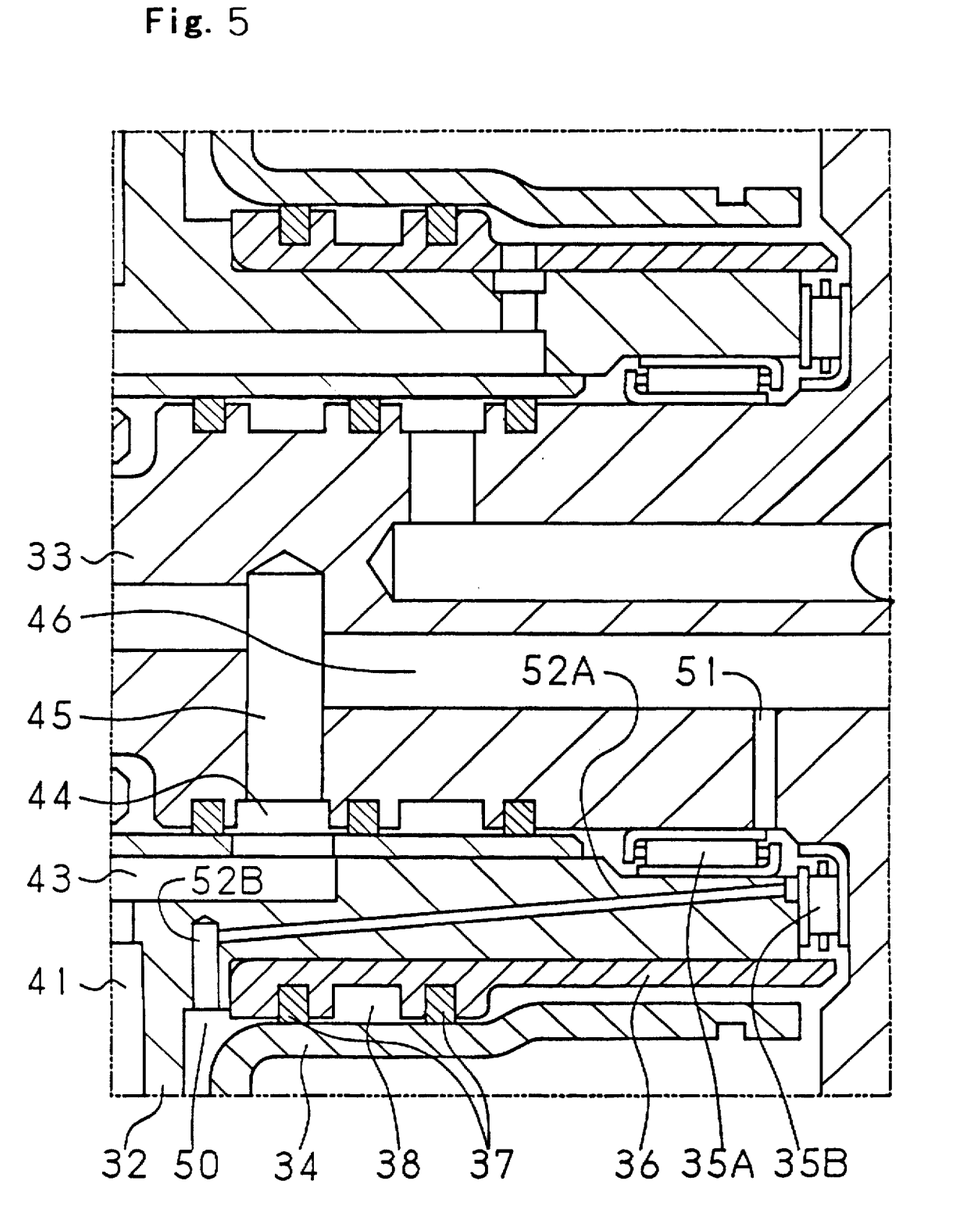
FIG. 5 is an enlarged sectional view of the lubricating structure.

As illustrated and enlarged in FIG. 5, leaking oil from the oil passage hole 51 driven by hydraulic pressure in the axial oil passage 46 lubricates bearings 35A, 35B. The oil discharged from the oil passage hole 51 is driven by centrifugal force produced following the rotation of the main shaft 33 and hence leaks out from a slanting oil passage 52A of the oil passage structure (52) into the space 50 after passage through a vertical oil passage 52B. The oil lubricates externally the one seal ring 37 fitted to the sleeve 36.

Figure 8:
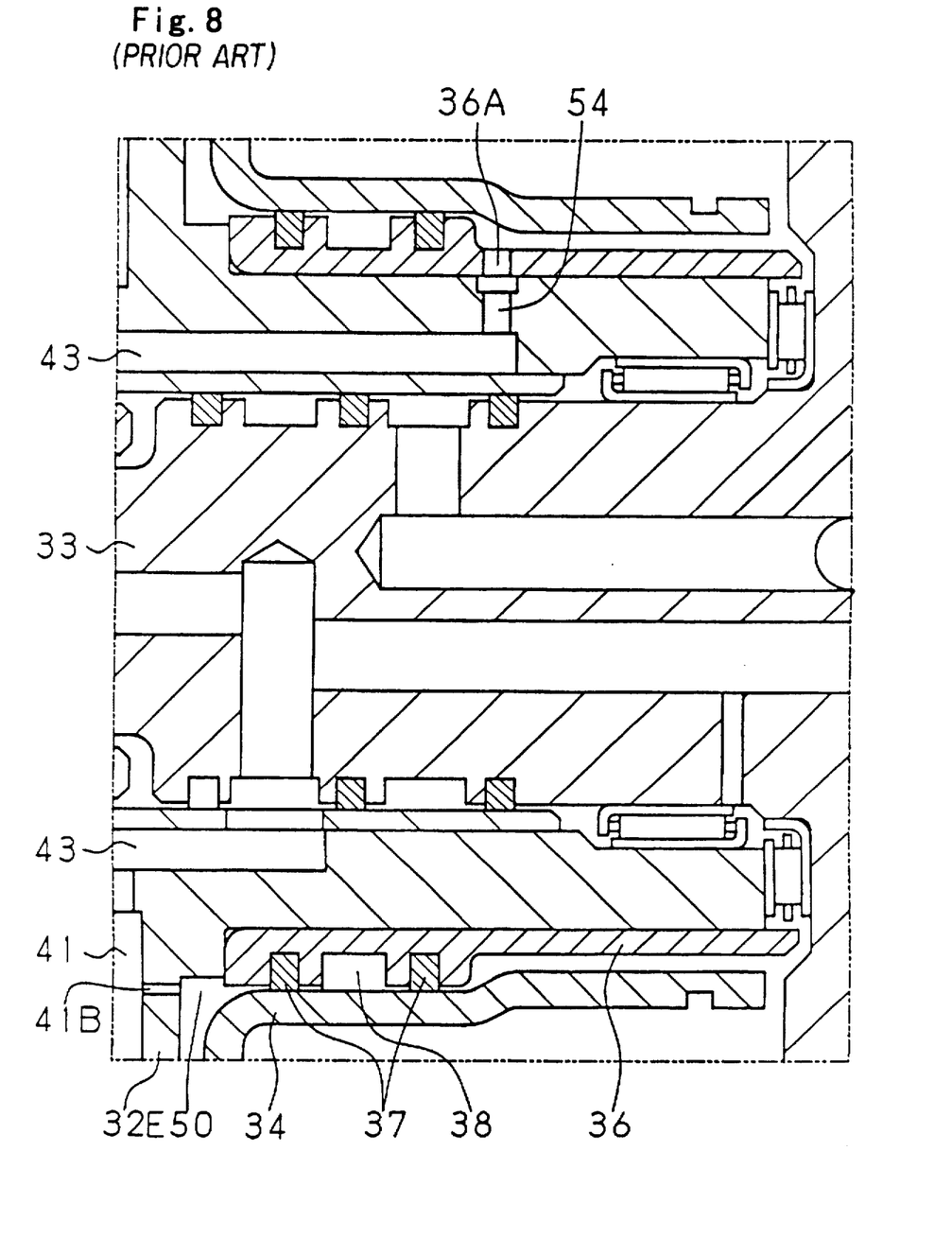
FIG. 8 is a view of an oil passage structure of a comparison example corresponding to a prior art example.

Referring to FIG. 8, there is provided a view of an oil passage structure of a comparison example. A partition member 32E in the comparison example is different from the partition member 32 in the second embodiment only in an oil passage structure for guiding lubricating oil to the space 50. In the following, the identical symbols to those of the second embodiment shall be applied to other parts of the partition member 32E and to other members and detailed description thereof will be omitted.

In the comparison example, there is provided an oil passage hole 41B communicated directly with the space 50 from the vertical oil passage 41 as described previously as the conventional technique for lubricating the seal ring 37 externally. In such an oil passage structure, pressure in the vertical oil passage structure 41 is lowered owing to leakage of the oil through the oil passage hole 41B.

Further, provided oil temperature rises and viscosity is lowered, the pressure in the vertical oil passage 41 is further lowered. There might be accordingly caused the fear that there is insufficient the oil leaking to a final end of an oil passage branching from the vertical oil passage 41, e.g., the oil leaking between the sleeve 36 and the clutch drum 34 from the cylindrical oil passage 43 (upper part in the figure) through the oil passage hole 54.

Although in order to restrict the lowering of the pressure in the vertical oil passage 41 it will do to make the oil passage hole 41B thinner, there is a limitation to the size of a hole capable of being drilled at a position of the oil passage hole 41B from the viewpoint of the structure of the external appearance of the partition member 32E, and a smaller hole facilitates clogging of the oil passage hole 41B with impurities and dust.

In accordance with the oil passage structure 29 in the second embodiment, the same effect as that in the first embodiment is ensured. Compared with the reference example in FIG. 8, there is used the oil discharged from the oil passage 51 branching from the vertical oil passage 41 which is also used to lubricate the bearings 35A, 35B so that there is reduced variations of the hydraulic pressure in the vertical oil passage 41 caused following a change in the oil temperature and there is hence reduced the possibility of a flow rate of the oil being insufficient at the final end of the lubricating passage.

There can be adopted an oil passage hole with a large diameter where there is no possibility of its being clogged with dust and impurities. Since the oil passage structure (52A, 52B) are provided within the thickness of the shaft shaped part 32E, a flow passage configuration and a cross-sectional shape are not restricted by the outer appearance of the sleeve 36 and hence free folding configuration and inclination are useable.

Figure 6:
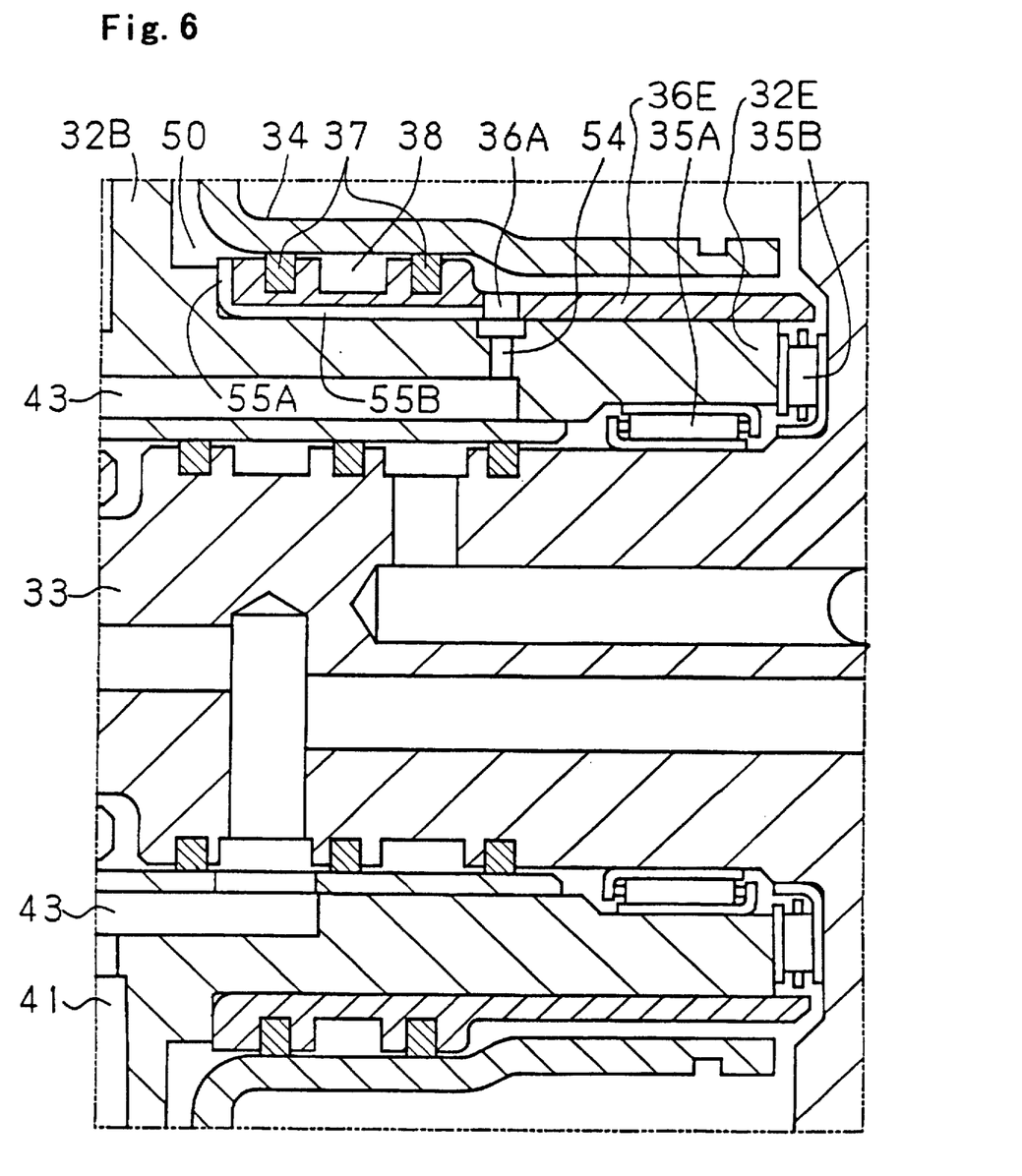
FIG. 6 is a sectional view of an oil passage structure according to a third embodiment.

In the following, there will be described an oil passage structure according to a third embodiment with reference to FIG. 6. In the present embodiment, such an oil passage structure 52 as in the partition member 32 in the second embodiment is not formed for the partition member 32B, and there is provided only in the sleeve 36E an oil passage structure having the same function as that of the oil passage structure 52.

In the following, the same symbols as those in the second embodiment shall be applied to other parts of the partition member 32B and the sleeve 36E and to other members and detailed description thereof will be omitted.

Lubricating oil supplied through the vertical oil passage 41 flows into the oil passage 43, and is thereafter directed to branch in respective directions. One of the branches reaches from the oil passage 43 (shown upward in the figure) through the oil passage 54 having high flow passage resistance to the outer peripheral surface of the shaft shaped part 32E, and after passing through the oil passage hole 36A in the sleeve 36E reaches a facing interval between the sleeve 36E and the clutch drum 34.

More specifically, in the oil passage structure in the third embodiment, part of the oil discharged from the oil passage 43 as the lubricating oil supply passage through the oil passage hole 54 having high flow passage resistance is branched and bypassed to the space 50 between the partition member 32B and the clutch drum 34.

The oil leaking from the oil passage hole 36A by being driven by the hydraulic pressure in the cylindrical oil passage 43 lubricates the seal ring 37 on the tip end side of the shaft shaped part 32E externally, and flows out axially to lubricate the bearings 35A, 35B externally. The oil leaking from the oil passage hole 36A and flowing axially forms pressure loss along the flow passage to increase the hydraulic pressure in the oil passage hole 36A and hereby press part of the oil into an oil passage groove 55B formed in the inner peripheral surface of the sleeve 36E. The oil after passing through an oil passage groove 55A formed in a rising surface of the sleeve 36E from the oil passage groove 55B leaks out into the space 50, and lubricates externally the one seal ring 37 fitted to the sleeve 36E.

In accordance with the oil passage structure of the third embodiment, the oil passage grooves 55A, 55B are formed by making use of the mating surfaces of the sleeve 36E and the shaft shaped part 32E so that the same effect as that in the second embodiment is ensured without applying drilling to the shaft shaped part 32E of the partition member 32B.

Compared with the structure of the through-hole in the second embodiment, crosssectional configurations and crosssectional areas of the oil passage grooves 55A, 55B can be freely set well enough, and cleaning of the grooves when they are clogged is ensured by pulling out the sleeve 36E from the shaft shaped part 32E.

Since the crosssectional areas of the oil passage grooves 55A, 55B are small, there is no influence thereof on the flow rate of the lubricating oil flowing downward the oil passage hole 36A. Since the oil discharged from the oil passage 43 flows through the oil passage grooves 55A, 55B after passage through the oil passage hole 54 having high flow passage resistance, and the oil passage 43 is branched from the vertical oil passage 41 and located downstream the same, provision of the oil passage grooves 55A, 55B does not affect the pressure in the vertical oil passage 41 and hence flow rates of other lubricating circuits are prevented from being insufficient.

Figure 7:
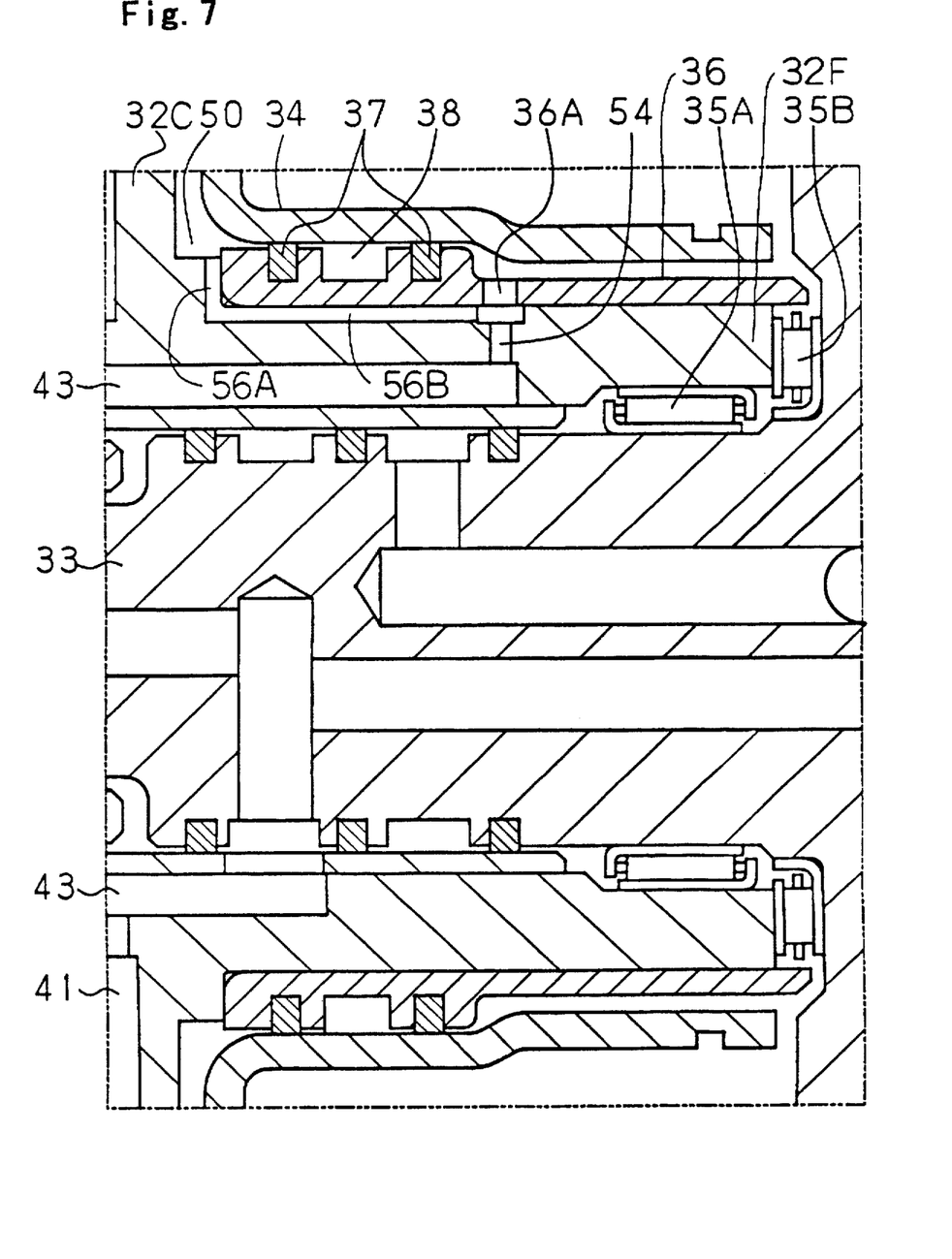
FIG. 7 is a sectional view of an oil passage structure according to a fourth embodiment.

In the following, there will be described an oil passage structure according to a fourth embodiment with reference to FIG. 7. In the present embodiment, an oil passage structure like that in the third embodiment is formed exclusively by machining the shaft shaped part 32F of the partition member 32C.

In the following description, the same symbols as those in the second embodiment shall be applied to parts other than the shaft shaped part 32F of the partition member 32C and to other members and the detailed description thereof will be omitted.

An oil passage structure formed by covering the oil passage grooves 56A, 56B formed in the shaft shaped part 32F of the partition member 32C with the sleeve 36 partly branches in quite the same manner as the oil passage structure in the third embodiment the oil discharged from the oil passage 43 as the lubricating oil supply passage through the oil passage hole 54 having high flow passage resistance to bypass it to the space 50 between the partition member 32C and the clutch drum 34.

The oil leaking from the oil passage hole 36A by being driven by the hydraulic pressure in the cylindrical oil passage 43 lubricates the seal ring 37 on the tip end side of the shaft shaped part 32F externally, and flows out axially to lubricate the bearings 35A, 35B externally. The oil leaking from the oil passage hole 36A and flowing axially forms pressure loss along the flow passage to increase the hydraulic pressure in the oil passage hole 36A and hence press part of the shaft shaped part 32F. The oil after passing through the radial oil passage groove 56A from the oil passage groove 56B leaks out into the space 50 to lubricate externally the one seal ring 37 fitted to the sleeve 36.

In accordance with the oil passage structure in the fourth embodiment, the oil passage grooves 56A, 56B are formed by making use of the mating surfaces of the sleeve 36 and the shaft shaped part 32F so that the same effect as that in the third embodiment is ensured without drilling the shaft shaped part 32F and without applying groove machining to the sleeve 36.

Since the cross sectional areas of the oil passage grooves 56A, 56B are small, they do not affect the flow rate of the lubricating oil downstream the oil passage hole 36A. The oil discharged from the oil passage 43 flows through the oil passage grooves 56A, 56B after passage through the oil passage hole 54 having high flow passage resistance, and further the oil passage 43 is adapted to branch the vertical oil passage 41 and is located downstream the same so that the provision of the oil passage grooves 56A, 56B does not affect the pressure in the vertical oil passage 41 and hence flow rates of other lubricating circuits are prevented from being insufficient.

What is claimed is:

1. An apparatus comprising:
   a support wall fixed to a casing of a transmission on a side of an outer periphery thereof;
   a rotor supporter provided on said support wall;
   a pair of seal rings disposed on opposite sides of a circumferential oil groove provided in an outer periphery of the rotor supporter;
   a bearing disposed on the side of a protruded tip end of said rotor supporter, wherein the bearing is lubricated with oil discharged from a lubricating oil supply passage provided in the transmission; and
   a cylindrical part formed on a side of a center of one rotary element of the transmission being rotatably supported on said rotor supporter in a state where said circumferential oil groove is sealed with said seal rings;
   wherein an oil passage structure is provided that reaches a location on an outer peripheral surface of the rotor supporter close to said support wall from the side of said bearing of said rotor supporter to guide at least part of the oil discharged from said lubricating oil supply passage to lubricate said bearing to a space close to said support wall; and
   wherein said rotor supporter is formed by fitting a cylindrical sleeve member to an outer periphery of a columnar shaped shaft shaped part that is formed integral with and protrudes axially from said support wall, said cylindrical sleeve member including said circumferential oil groove and a pair of grooves formed on opposite sides of said circumferential oil groove to which grooves said seal rings are fitted.

2. An apparatus according to claim 1, wherein said oil passage structure is a groove formed in at least one of mating surfaces of said shaft shaped part and said sleeve member.

3. An apparatus according to claim 2, wherein said sleeve member includes an insertion cylinder for holding the outer peripheral surface of said shaft shaped part thereinside, and an annular cover extending inwardly from one end of said insertion cylinder and being held between the tip end surface of said shaft shaped part on said bearing, and wherein said oil passage structure includes a groove formed in at least one of the surface of said shaft shaped part on the side of the tip end of the same and said cover.

4. An apparatus comprising:
   a support wall fixed to a casing of a transmission on a side of an outer periphery thereof;
   a rotor supporter provided on said support wall;
   a pair of seal rings disposed on opposite sides of a circumferential oil groove provided in an outer periphery of the rotor supporter;
   a bearing disposed on the side of a protruded tip end of said rotor supporter, wherein the bearing is lubricated with oil discharged from a lubricating oil supply passage provided in the transmission; and
   a cylindrical part formed on a side of a center of one rotary element of the transmission being rotatably supported on said rotor supporter in a state where said circumferential oil groove is sealed with said seal rings;
   wherein an oil passage structure is provided that reaches a location on an outer peripheral surface of the rotor supporter close to said support wall from the side of said bearing of said rotor supporter to guide at least part of the oil discharged from said lubricating oil supply passage to lubricate said bearing to a space close to said support wall;
   wherein said rotor supporter is formed by fitting a cylindrical sleeve member to an outer periphery of a columnar shaped shaft shaped part formed integral with and extending axially from said support wall, said cylindrical sleeve member including said circumferential oil groove and the pair of the grooves formed on opposite sides of said circumferential oil groove to which grooves said seal ring is fitted; and wherein said oil passage structure is a through-hole provided in said shaft shaped part.

5. An apparatus comprising:

a support wall fixed to a casing of a transmission on the side of an outer periphery thereof;

a rotor supporter provided on said support wall;

a pair of seal rings disposed on opposite sides of a circumferential oil groove provided in an outer periphery of the rotor supporter;

a bearing disposed on the side of a protruded tip end of said rotor supporter, the bearing being lubricated with oil discharged through an orifice from a lubricating oil supply passage provided in the transmission;

a cylindrical part formed on the side of the center of one rotary element of the transmission being rotatably supported on said rotor supporter in the state where said circumferential oil groove is sealed with said seal rings, and an oil passage structure reaching a location on an outer peripheral surface of the rotor supporter close to said support wall to guide at least part of the oil discharged through said orifice from said lubricating oil supply passage for lubricating said bearing to a space close to said support wall.

* * * * *